United States Patent [19]

Konishi et al.

[11] Patent Number: 4,895,409

[45] Date of Patent: Jan. 23, 1990

[54] CONVERTIBLE VEHICLE BODY STRUCTURE

[75] Inventors: Takeshi Konishi; Takanori Tuchiya, both of Hiroshima, Japan

[73] Assignee: Mazda Motor Corporation, Hiroshima, Japan

[21] Appl. No.: 141,763

[22] Filed: Jan. 11, 1988

[30] Foreign Application Priority Data

Jan. 12, 1987 [JP] Japan .................................. 62-4618

[51] Int. Cl.$^4$ .............................................. B60J 7/16
[52] U.S. Cl. .................................... 296/107; 296/117; 296/216
[58] Field of Search ............... 296/107, 116, 117, 216, 296/186

[56] References Cited

U.S. PATENT DOCUMENTS

| | | | |
|---|---|---|---|
| 2,215,363 | 9/1940 | Rupple et al. | 296/107 |
| 2,596,355 | 5/1952 | Ackermans | 296/117 X |
| 2,632,670 | 3/1953 | Crenshaw | 296/117 |
| 2,856,231 | 10/1958 | Zeman | 296/117 |
| 2,939,742 | 6/1960 | Dardarian et al. | 296/107 |
| 3,021,174 | 2/1962 | Rund | 296/107 |
| 3,347,592 | 10/1967 | Renneker | 296/107 |
| 4,557,502 | 12/1985 | Scaduto et al. | 280/756 |
| 4,729,592 | 3/1988 | Tuchiya et al. | 296/107 |

FOREIGN PATENT DOCUMENTS

| | | | |
|---|---|---|---|
| 3639376 | 5/1987 | Fed. Rep. of Germany | 296/107 |
| 605961 | 6/1960 | Italy | 296/107 |
| 57617 | 5/1978 | Japan . | |
| 2086316 | 5/1982 | United Kingdom . | |

Primary Examiner—Dennis H. Pedder
Attorney, Agent, or Firm—Fleit, Jacobson, Cohn, Price, Holman & Stern

[57] ABSTRACT

A convertible vehicle body including a roof structure which is comprised of a front roof panel section and a rear roof panel section both of a rigid structure. The front roof panel section is supported by a swingable pillar of an inverted U-shape which has a pair of legs pivotably connected to the side panels of the body for movement between an extended position and a retracted position. In the retracted position, the front roof panel section is retracted into a storing space located just behind the rear seat provided in the passenger compartment. The rear roof panel section is mounted so that it can be drawn into a rear storing space provided in the rear package space of the body by being guided by a guide mechanism including guide rails provided in the rear storing section and sliding shoes provided on the rear roof panel section.

14 Claims, 7 Drawing Sheets

CONVERTIBLE VEHICLE BODY STRUCTURE

BACKGROUND OF THE INVENTION

1. Field of the Invention

The present invention relates to a vehicle body structure and more particularly to a convertible vehicle body structure. More specifically, the present invention pertains to a convertible vehicle body having a roof structure which is divided into front and rear roof portions which are retracted separately into the vehicle body.

2. Description of the Prior Art

A typical type of convertible vehicle body is the one which has a roof structure made of a foldable hood. Since the foldable hood is flexible in nature, it has a tendency of fluttering under a high speed operation of the vehicle. Further, the foldable hood structure does not give an attractive appearance.

The Japanese laid-open patent application 53-57617 corresponding to the Italian patent application 69625 filed in Italy on Nov. 2, 1976 discloses a convertible vehicle body structure having a rigid roof. According to the teachings by the Japanese patent application, the front part of the roof is separated from the rear part and the front part is retracted by means of a linkage and a guide mechanism into a space provided behind the passenger's seats. The Japanese patent application however does not teach at all with respect to the rear part of the roof.

The British Pat. No. 2,086,316 discloses a convertible vehicle body which has roof structure including a rigid front roof panel and a foldable rear hood section. The front roof panel is designed so that it can be removed by hand. The rear hood section has at a front edge portion a roll hoop member of an inverted U-shape which is swingable between an extended position in which the hoop member stands upright from the body and a retracted position in which the hoop member is retracted into the body. The structure disclosed by the British patent is disadvantageous in that the front roof panel must be removed by hand to obtain an open top feature. Further, the foldable hood adopted in the rear section does not make the appearance of the body attractive.

The U.S. Pat. No. 2,939,742 discloses a convertible vehicle body structure including a roof structure having a front and rear roof sections both made of rigid panels. The front roof panel is hinged at the rear edge portion to the front edge portion of the rear roof panel and the front and rear roof panels are moved simultaneously between an extended position and a retracted position. In the retracted position, the roof panels are laid one over the other and stored in a rear portion of the vehicle body. The structure proposed by the U.S. patent is not recommendable in that it would not be easy to secure the space for storing the roof panels because of the interference with the tire houses for the rear wheels. Further, the mechanism for actuating the roof panels will become complicated.

The U.S. Pat. No. 4,557,502 discloses another type convertible vehicle body which has a roll bar of an inverted U-shape for supporting a rear edge portion of a rigid roof panel. The roof panel is removed by hand and the roll bar is powered to move between an extended position and a retracted position. This structure is not convenient for providing an open top feature because the roof panel must be manually removed. Further, the structure cannot be easily applied to a vehicle body having rear seats.

SUMMARY OF THE INVENTION

The present invention has an object to provide a convertible vehicle body having a rigid roof structure which can be readily retracted into the body structure.

Another object of the present invention is to provide a roof structure for a convertible vehicle body which are divided into a front and rear roof sections which are retractable into the body structure.

A further object of the present invention is to provide a convertible vehicle body including a roof structure having a front and rear roof sections which are retractable into different portions of the vehicle body.

According to the present invention, the above and other objects can be accomplished by a convertible vehicle body including a body structure having front windshield means, side panel means defining a side belt line at upper edge portions thereof, a passenger compartment provided in the body structure rearwards the front windshield means and between the side panel means, a roof structure including a rigid front roof panel section and a rigid rear roof panel section, swingable pillar means connected with said front roof panel section and having leg means pivotably connected with said side panel means for movement together with said front roof panel section between an erected position wherein said front roof panel section is engaged at a front edge portion with said front windshield means and a retracted position wherein said swingable pillar means and said front roof panel section are stored in a front storing section provided in said body structure rearwards the passenger compartment, a rear storing section provided in said body structure rearwards the front storing section, guide means provided in said rear storing section and inclined downwards toward rearward, slide means connected with said rear roof panel section and movable along said guide means whereby said rear roof panel section is movable between an extended position wherein said rear roof panel section is engaged at a front edge portion with a rear edge portion of the front roof panel section and a retracted position wherein said rear roof panel section is retracted into said rear storing section.

According to the features of the present invention, the front and rear roof panel sections are stored in different storing sections so that a versatility is obtained in determining the locations of the storing sections. For example, the front storing section for storing the front roof panel section may be provided just behind the passenger's seats which will be provided in the passenger compartment. The rear storing section may be located with a space with respect to the front storing section. For example, the rear storing section may be located rearwards the rear tire houses which may be provided in said side panel means. Thus, according to the features of the present invention, the external profile of the vehicle body will not be affected by the provision of the storing sections for the front and rear roof panel sections.

The above and other objects and features of the present invention will become apparent from the following descriptions of a preferred embodiment taking reference to the accompanying drawings.

DESCRIPTION OF THE PREFERRED EMBODIMENT

Figure 1:
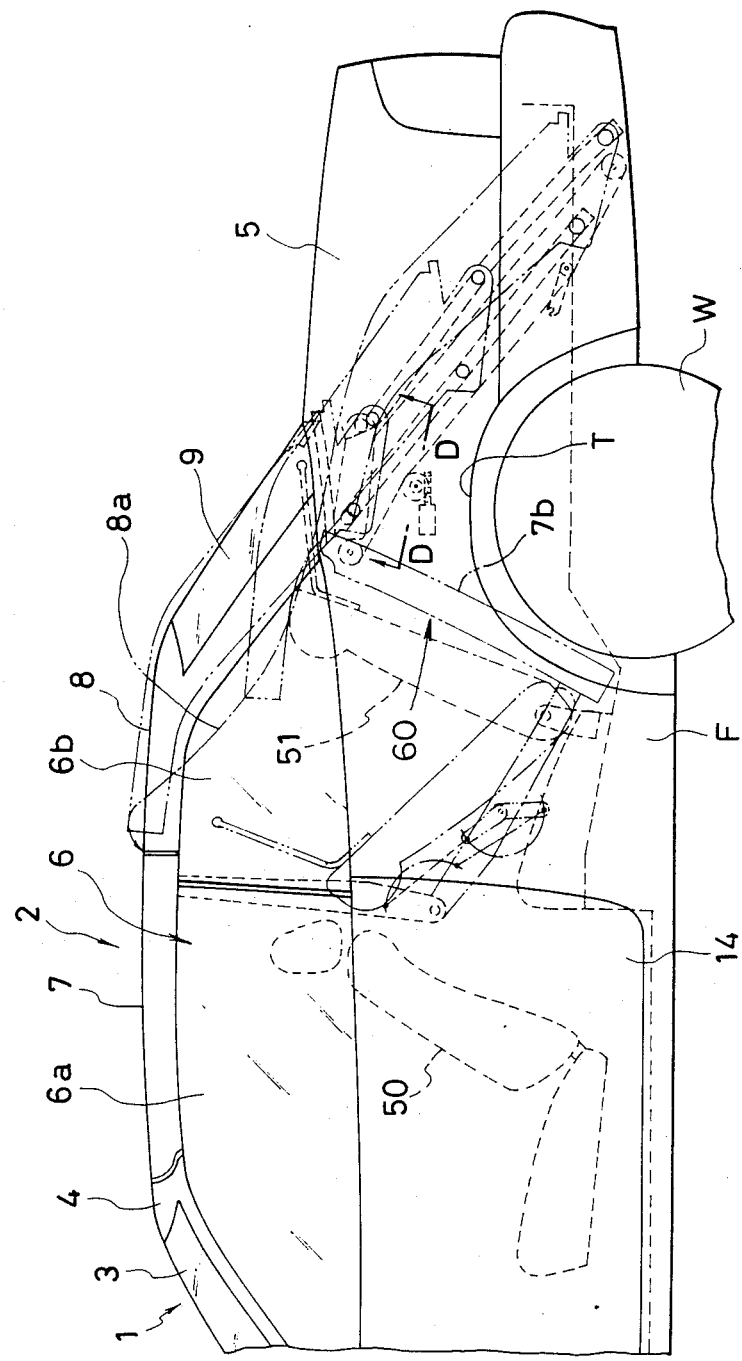
FIG. 1 is a side view of a vehicle body in accordance with one embodiment of the present invention.

Referring to the drawings, particularly to FIG. 1, there is shown a vehicle body 1 having a front windshield assembly 3 provided at an upper edge portion with a front header 4. The body 1 further has a pair of side panels each including a rear fender F defining a side belt line 12 at an upper edge portion thereof. The rear fender F has a front edge which defines a side door opening in which a side door 14 is positioned. A rear body section 5 is provided by the rear fenders F and other panel members which are well known in the art. In the body 1, there is defined a passenger compartment 6 including a front compartment section 6a and a rear compartment section 6b.

Figure 6:
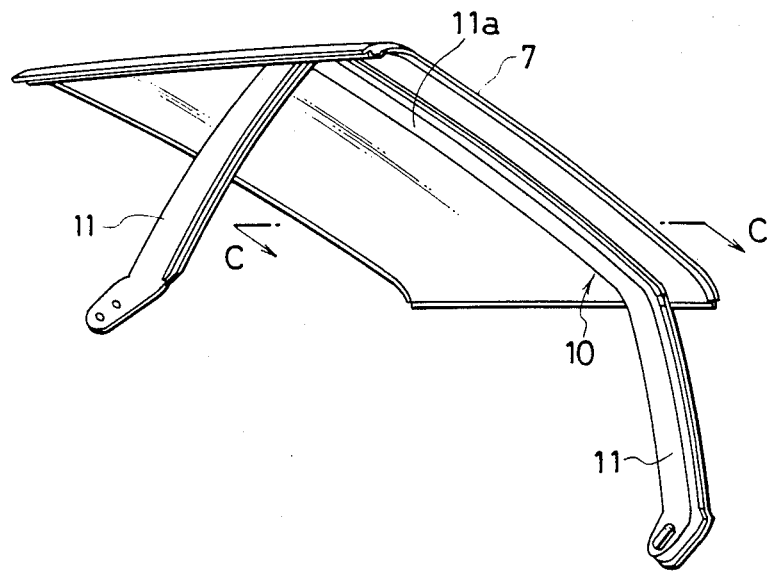
FIG. 6 is a perspective view of the front roof panel section and the swingable pillar.

In order to cover the top portion of the compartment 6, there is provided a roof structure 2 which includes a front roof panel section 7 and a rear roof panel section 8. The rear roof panel section 8 is provided with a transparent rear window glass panel 9. As shown in FIG. 6, the front roof panel section 7 is connected with a swingable pillar 10 of a substantially inverted U-shape. The swingable pillar has a pair of leg portions 11 and an intermediate portion 11a and the intermediate portion 11a is attached to the inner surface of the front roof panel section 7. The front roof panel section 7 is of a substantially rigid structure and may be made of a molded plastic material. Similarly, the rear roof panel section 8 is of a substantially rigid structure and may be made of a suitable material such as steel sheets or other sheet metal.

Figure 7:
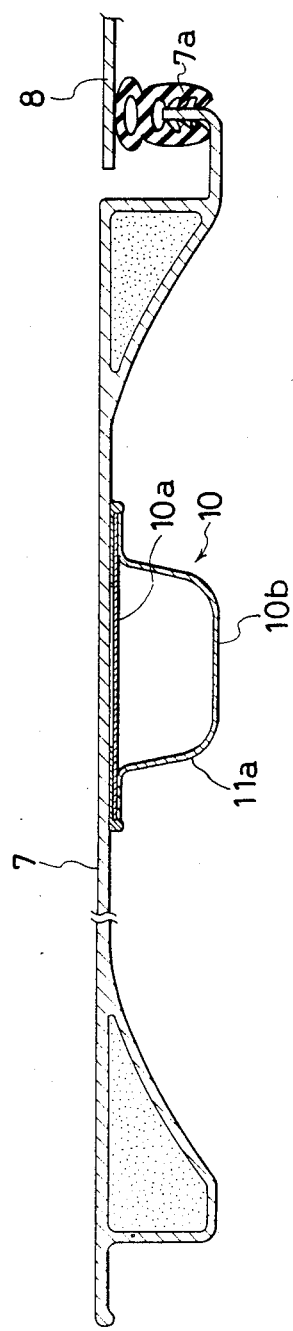
FIG. 7 is a sectional view taken along the line C—C in FIG. 6.

FIG. 7 shows a longitudinal section of the front roof panel section 7. As shown, the roof panel section 7 has a peripheral portion of an increased thickness so that the rigidity of the panel section is increased. A weather strip 7a is provided along the rear edge. The swingable pillar 10 is of a closed cross-section including an outer panel 10a and an inner panel 10b which are welded together. At the intermediate portion 11a the pillar 10 is adhesively attached to the inner surface of the front roof panel section 7.

Figure 3:
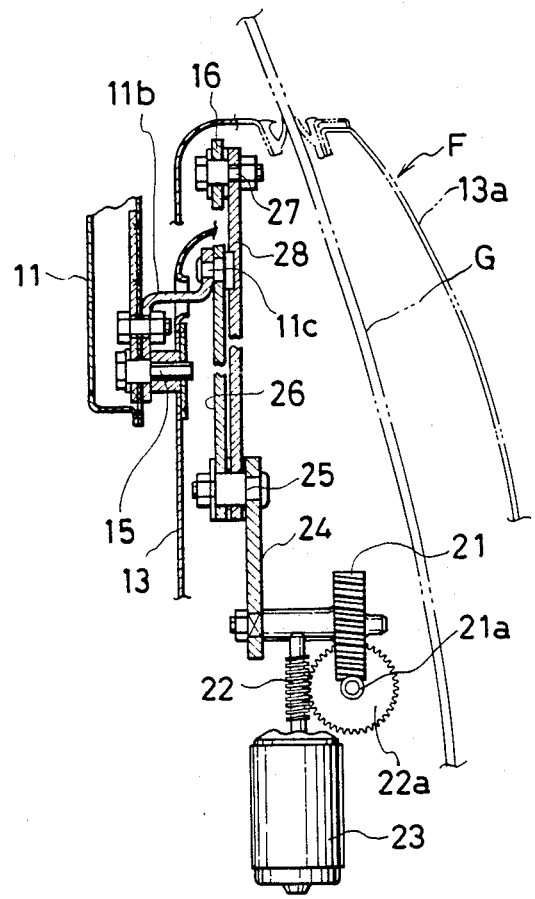
FIG. 3 is a view as seen in the direction of the arrow A in FIG. 2.

Referring to FIG. 3, it will be noted that the rear fender F includes an inner panel 13 and an outer panel 13a which are welded together with an appropriate spacing therebetween. At each side of the vehicle body 1, the leg portion 11 of the swingable pillar 10 is pivotably connected with the inner panel 13 of the rear fender F by means of a pivot pin 15 which is provided in the vicinity of the front edge portion of the front fender F.

At the lower end portion, the leg portion 11 of the swingable pillar 10 is attached with an arm 11b which extends into the space between the inner panel 13 and the outer panel 13a of the rear fender F. A front roof driving mechanism is provided in the space between the inner panel 13 and the outer panel 13a and includes an electric motor 23. The motor 23 has an output shaft connected with a worm 22 which is engaged with a worm wheel 22a. A second worm 21a is provided coaxially on the worm 22a and engaged with a worm wheel 21 which has a shaft secured to one end of a lever 24. The other end of the lever 24 is pivotably connected through a pivot pin 25 with one end of a link 26 which is in turn pivotably connected at the other end through a pivot pin 11c with the arm 11b.

Figure 2:
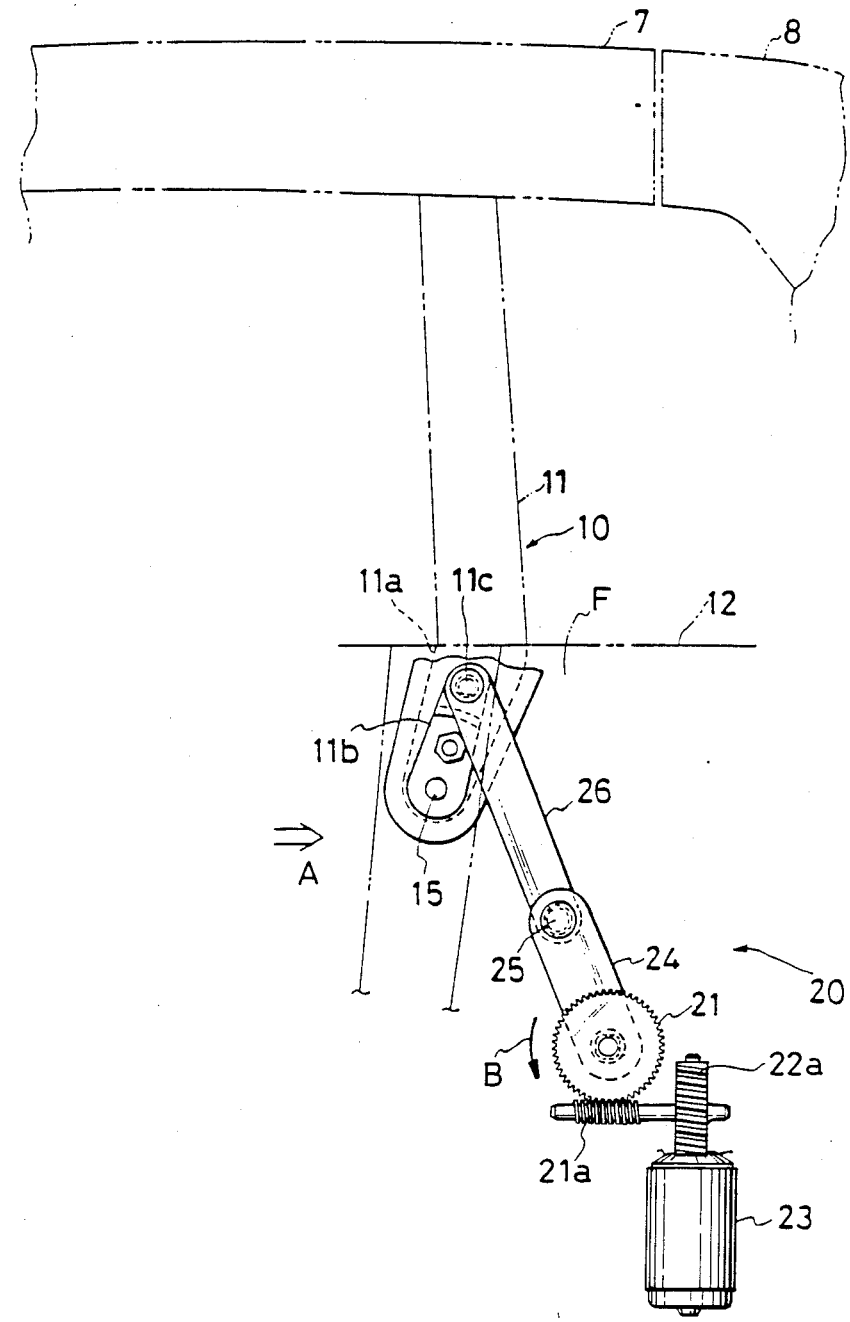
FIG. 2 is a fragmentary view of the mechanism for moving the front roof panel section.

FIG. 2 shows the linkage in a position wherein the front roof panel section 7 is in the extended or erected position to cover the front top portion of the passenger compartment 6. In this position, the lever 24 and the link 26 extend substantially along a straight line. The front roof panel section 7 is engaged at the front edge with the front header 4 of the front windshield. An appropriate weather strip may be provided on the front header 4. When the motor 23 is operated to rotate the worm wheel 21 in the direction shown by an arrow B, the arm 11b is turned in the clockwise direction as seen in FIG. 2. The swingable pillar 10 is then swung in the same direction so that the front roof panel section 7 is retracted in the rear body section 5. As shown in FIG. 1, the vehicle body 1 is provided with front seats 50 in the front compartment 6a and rear seats 51 in the rear compartment 6b. Before retracting the front roof panel section 7, the seat back of the rear seat 51 is folded forwardly as shown by phantom lines in. FIG. 1 and the front roof panel section 7 is retracted in the position shown by dotted lines 7b in FIG. 1. In this embodiment, a storing section 60 for the front roof panel section 7 is provided at least partially just behind the rear seats 51. It will be noted that the front roof panel section 7 can be stored in front of tire housings T formed in the rear fender F for providing spaces for the rear wheels W.

Figure 4:
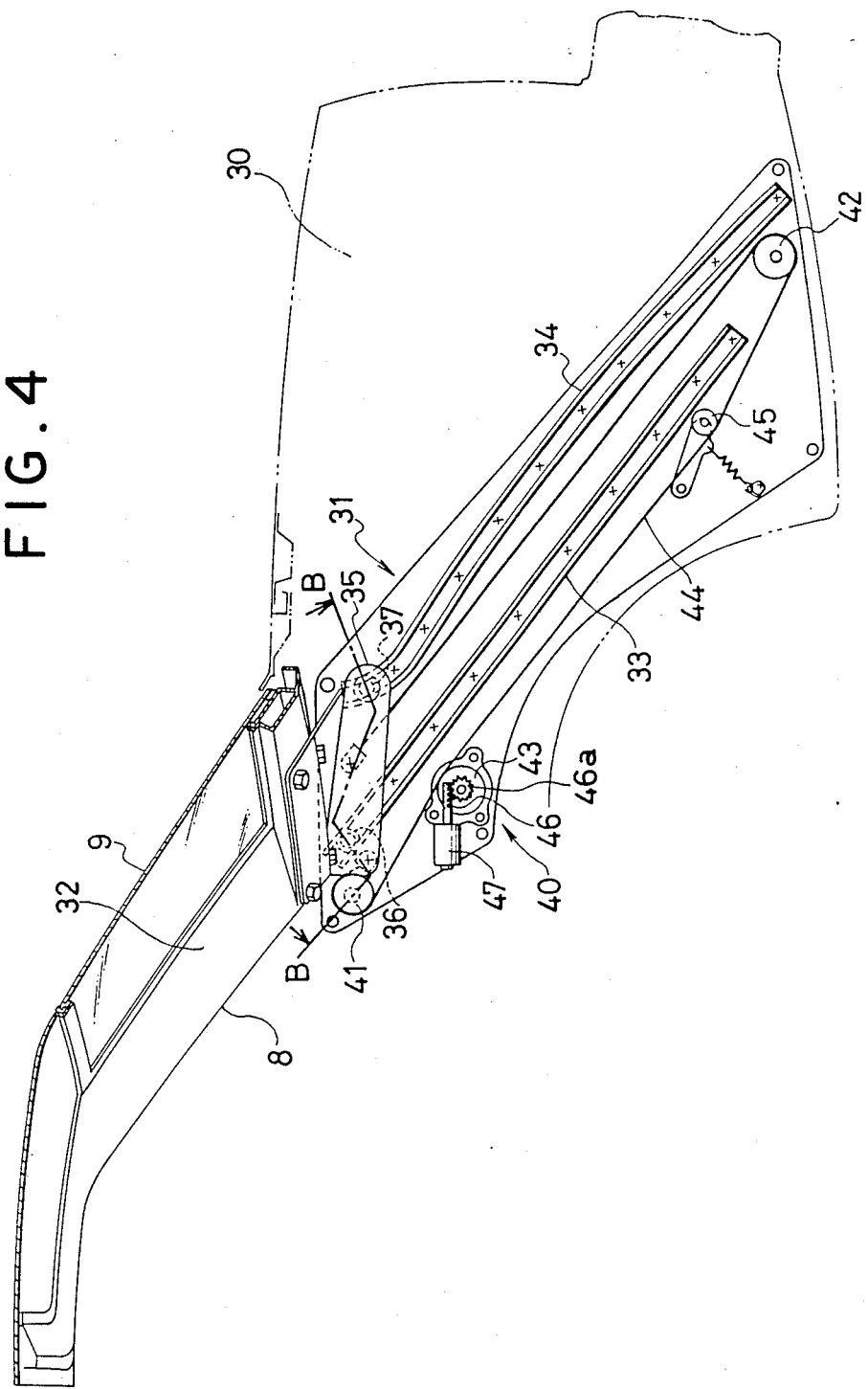
FIG. 4 is a sectional view showing the mechanism for moving the rear roof panel section.
Figure 5:
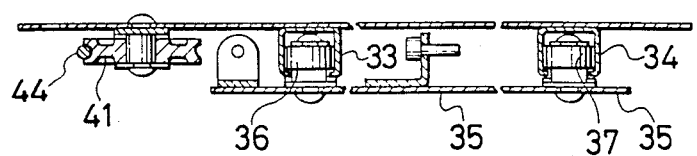
FIG. 5 is a sectional view taken along the line B—B in FIG. 4.

Referring now to FIG. 4, it will be noted that the rear body section 5 is provided with a package space 30 which is intended to store packages for the passengers. In the package space 30, the inner panel of the rear fender F at each side is provided with a roof guide assembly 31 which includes a first guide rail 33 and a second guide rail 34 both of a channel shaped cross-section. It will be noted in FIG. 4 that the first guide rail 33 is substantially straight. The second guide rail 34 which is located rearwards the first guide rail 33 is substantially straight in a substantial part of its length and arranged in parallel with the first guide rail 33. It should be noted, however, that the upper portion of the second guide rail 34 is bent upwardly as shown in FIG. 4. As shown in FIG. 4, the rear roof section 8 has a rear pillar portion 32 at each side. It is preferable that the first and second guide rails 33 and 34 are oriented to incline downwards toward rearward and the angle of inclination is substantially the same as that of the rear pillar portion 32 of the rear roof panel section 8.

Figure 8:
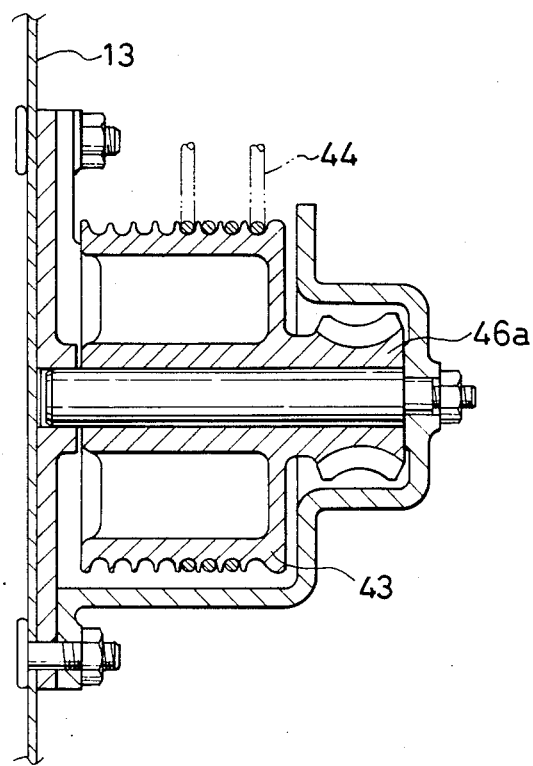
FIG. 8 is a sectional view taken along the line D—D in FIG. 1.

A sliding plate 35 has a pair of sliding shoes 36 and 37 which are respectively engaged with the guide rails 33 and 34. The sliding plate 35 is secured to the lower end portion of the rear roof panel section 8. There is provided a driving mechanism 40 for driving the rear roof panel section 8. The driving mechanism 40 includes a driving motor 47 which has an output shaft connected with a worm 46. The worm 46 is engaged with a worm wheel 46a which is integral with a driving drum 43 as shown in FIG. 8. A wire 44 is wound around the driving drum 43 and passed around pulleys 41 and 42 provided on the inner panel of the rear fender F at the opposite end portions of the guide mechanism 40. The first pulley 41 is located adjacent to and in front of the upper end portion of the guide rail 33. The second pulley 42 is located adjacent to and in front of the lower end portion of the guide rail 34. The wire 44 is fixed to the sliding plate 35 at the opposite ends so that a rotation of the motor 47 is transmitted through the worm mechanism and the wire 44 to the sliding plate 35 to drive the rear roof panel section 8 between an extended position shown by solid lines in FIG. 1 and a retracted position wherein the roof panel section 8 is retracted along the guide mechanism 40 into the package space 30 as shown by phantom lines in FIG. 1. In order to maintain the wire under a sufficient tension, there may be provided a wire tensioner 45 of a known type. In FIG. 1, the phantom line 8a designates the trace of the front edge of the rear roof panel section 8 in the course of movement between the extended position and the retracted position.

In operating the roof structure 2 from the extended position to the retracted position, the rear roof panel section 8 is at first started to move so that the panel section 8 is slidably retracted along the guide mechanism 40. In the course of the movement, the front edge of the panel section 8 is at first lifted and then moved downward along the line 8a. The front edge of the rear roof panel section 8 is engaged with the weather strip 7a in the extended position as shown in FIG. 7. By moving the rear roof panel section as described above, it is possible to prevent the weather strip 7a from being damaged by the movement of the rear roof panel 8. This movement of the front edge of the rear roof panel section 8 can be accomplished by the configuration of the second guide rail 34 as previously described.

When the rear roof panel section 8 is moved by a sufficient extent, the front roof panel section 7 is started to move. Thus, the front roof panel section 7 is actuated to the retracted position. It will be noted in FIG. 1 that the storing section 60 for the front roof panel section 7 is provided at least partially just behind the rear seats 51 but in front of the rear tire housing T. The storing section 62 for the rear roof panel section 8 is spaced rearwardly from the storing section 60 for the front roof panel section 7 and located at least partially rearwards the rear tire housing T. The structure described above provides a versatility for designing the profile of the vehicle body without being restricted by possible interference between the tire house and the roof panel storing section. The vehicle body as illustrated is of a type having rear seats, however, the concept of the present invention can be applied even to a vehicle body having only front seats.

It should therefore be understood that although the invention has been shown and described with reference to a specific embodiment, the invention is in no way limited to the details of the illustrated structures but changes and modifications may be made without departing from the scope of the appended claims.

We claim:
1. A convertible vehicle body comprising:
a body structure having a front windshield,
side panels defining a side belt line at upper edge portions thereof,
a passenger compartment provided in the body structure located rearward of said front windshield and between said side panels,
a roof structure including a rigid front roof panel section and a rigid rear roof panel section,
rear tire housings formed in said body structure for providing spaces for rear wheels,
a front storing section provided in said body structure and located at least partially forwardly of said rear tire housings and rearward from said passenger compartment for storing said rigid front roof panel section,
a rear storing section provided in said body structure and located at least partially rearwardly of said rear tire housings,
a swingable pillar connected with said front roof panel section and having legs pivotably connected with said side panels for movement together with said front roof panel section between an erected position wherein said front roof panel section is engaged at a front edge portion with said front windshield and a retracted position wherein said swingable pillar means and said front roof panel section are stored in said front storing section,
guide means provided in said rear storing section for guiding said rigid rear roof panel section into said rear storing section, said guide means being inclined downwardly and rearwardly,
slide means connected with said rear roof panel section and movable along said guide mans so that said rear roof panel section is movable between an extended position wherein said rear roof section is engaged at a front edge portion with an upper side of a rear edge portion of said front roof panel section and a retracted position wherein said rear roof panel section is retracted into said rear storing section,
said guide means including a pair of substantially parallel guide rails,
one of said guide rails being positioned rearwardly of the other of said guide rails,
said rear roof panel section being provided at a lower end portion with sliding plates having sliding shoes respectively engaged with said guide rails,
said one guide rail including a body portion extending rearwardly and downwardly and an upper bent portion extending toward said other guide rail and then away from said other guide rail in a substantially vertical direction,
a front end portion of said rear roof panel section being moved upwardly and rearwardly when moved from said extended position to said retracted position by movement of a respective one of said sliding shoes in said upper bent portion of said one guide rail.
2. A vehicle body in accordance with claim 1, wherein said side panels include an inner panel and an outer panel between which a space is formed, said legs extending downwardly beyond the side belt lines of said body structure and being pivotably connected to said inner panel of said side panels.
3. A vehicle body in accordance with claim 1, wherein a power drive is connected through a linkage to a lower portion of at least one of said legs of said swingable pillar for driving said swingable pillar.
4. A vehicle body in accordance with claim 3, wherein said linkage for connecting said power drive means with said legs of said swingable pillar includes two link members.

5. A vehicle body in accordance with claim 4, wherein said link members of said linkage are connected together so that said link members extend substantially along a straight line when said front roof panel section is in the erected position.

6. A vehicle body in accordance with claim 3, wherein each said side panel includes an inner panel and an outer panel between which a space is formed, said power drive means and said linkage being positioned in said space in said side panels, each of said legs of said swingable pillar and said linkage being connected by an arm which extends through said inner panel of each said side panel.

7. A vehicle body in accordance with claim 1, wherein said guide rails are of a channel shaped cross-section.

8. A vehicle body in accordance with claim 1, wherein second power drive means are connected with said rear roof panel section for driving said rear roof panel section along said guide means.

9. A vehicle body in accordance with claim 8, wherein said second power drive means includes wires passed around pulleys and connected with said rear roof panel section at opposite ends of said wires.

10. A vehicle body in accordance with claim 9, wherein said pulleys including a first pulley located adjacent to and in front of an upper end portion of said other guide rail and a second pulley located adjacent to and in front of a lower end portion of said one guide rail.

11. A vehicle body in accordance with claim 10, wherein said second power drive means includes a driving drum on which said wires are wound.

12. A vehicle body in accordance with claim 1, wherein said swingable pillar is of an inverted U-shape having an intermediate portion attached to an inner surface of said front roof panel section.

13. A vehicle body in accordance with claim 1, wherein said front storing section is located behind passenger seats provided in said passenger compartment.

14. A vehicle body in accordance with claim 1, wherein a rear body section is provided with a package space, said rear storing section being provided in said package space.

* * * * *